United States Patent [19]
Pauwels

[11] Patent Number: 5,268,896
[45] Date of Patent: Dec. 7, 1993

[54] COMMUNICATION SWITCHING ELEMENT

[75] Inventor: Bart J. G. Pauwels, Borgerhout, Belgium

[73] Assignee: Alcatel N.V., Amsterdam, Netherlands

[21] Appl. No.: 585,167

[22] PCT Filed: Mar. 26, 1988

[86] PCT No.: PCT/EP88/00273
§ 371 Date: Oct. 12, 1990
§ 102(e) Date: Oct. 12, 1990

[87] PCT Pub. No.: WO89/09521
PCT Pub. Date: Oct. 5, 1989

[51] Int. Cl.$^5$ .............................. H04Q 11/04
[52] U.S. Cl. ................... 370/60; 370/85.4; 370/85.5; 370/85.6; 370/85.9
[58] Field of Search ........... 270/85.4, 85.5, 85.9, 270/60, 85.6

[56] References Cited
U.S. PATENT DOCUMENTS

| | | | |
|---|---|---|---|
| 4,623,996 | 11/1986 | McMillen | 370/60 |
| 4,706,240 | 11/1987 | Payne, III | 370/60 |
| 4,771,419 | 9/1988 | Graves et al. | 370/60 X |
| 4,813,037 | 3/1989 | Debuysscher et al. | 370/60 |
| 4,817,082 | 3/1989 | Orsic | 370/85.5 X |

FOREIGN PATENT DOCUMENTS

| | | |
|---|---|---|
| 0256702 | 7/1987 | European Pat. Off. |
| 8704579 | 7/1987 | PCT Int'l Appl. |
| 8807298 | 9/1988 | PCT Int'l Appl. |

OTHER PUBLICATIONS

S. Nojima, E. Tsutsui, H. Fukuda, M. Hashimoto, "Integrated Services Packet Network Using Bus Matrix Switch," IEEE Journal, No. 8, Oct. 1987 (pp. 1284-1292).
Y. S. Yeh, "The Knockout Switch: A Simple, Modular ...", AT&T Bell Labs., IEEE Proceedings, New Jersey, Dec. 1987, pp. 801-808.
D. M. Dias, "Packet Switching Interconnection ...", IEEE Computer, Dec., 1981, pp. 43-52.

Primary Examiner—Douglas W. Olms
Assistant Examiner—Russell W. Blum
Attorney, Agent, or Firm—Robbins, Berliner & Carson

[57] ABSTRACT

Communication switching element to switch M signal inputs (I(1) to I(M)) to any of N signal outputs (O(1) to O(N)) and comprising MN buffers (Q(11) to Q(MN)) which are arranged in a matrix of M rows and N columns. Each buffer is used to store cells during their transit from the associated input to the associated output.

11 Claims, 3 Drawing Sheets

COMMUNICATION SWITCHING ELEMENT

TECHNICAL FIELD

The present invention relates to a communication switching element with buffer means associated with a plurality of signal inputs and signal outputs.

BACKGROUND ART

In such known switching elements buffer means can generally be associated with the signal inputs and/or with the signal outputs. In case they are associated with the signal inputs, when several signals arrive at a same signal input and have to be transmitted to a same signal output, the corresponding input buffer means may only be emptied at the signal transmission speed used on this signal output. This means that the following signals also arriving at this signal input and to be transmitted to another signal output have to wait for the completion of the transmission of the above preceding signals prior to being transmitted to their destination signal output even if the latter is not used.

In the switching element known from the PCT application published under No WO87/004579 and used in an Asynchronous Time Division (ATD) packet or cell switching system, buffer means associated with the signal outputs are preferred to avoid such input saturation. However, it requires at each of its signal outputs relatively large buffer means able to store signals simultaneously transmitted by all its signal inputs. Moreover, in order to be able to accept the signals from all the signal inputs, this known switching element operates at a speed or bitrate equal to the sum of the bitrates at which these signals are supplied at their respective signal input. As a result, the complexity of the element is increased.

A solution to reduce this switching speed and accordingly to decrease the complexity of the switching element is for instance proposed in the PCT/EP88/00212 application filed on Mar. 11, 1988 and consists in subdividing each of the input signals into a number of parts, particularly sub packets in an AID system. Thus, the switching speed of the element is also divided by the same number. However, additional circuits required to realise such subdivision and to combine these parts into an output signal also contribute to the complexity of the switching element.

In the article: "Packet Switching Interconnection Networks for Modular Systems" by D. M. Dias et al published in IEEE-COMPUTER of December 1981, pages 43 to 53, and more particularly on page 45 thereof, delta networks are considered wherein the links between stages of a packet switching network contain data buffers organized as first-in-first-out queues and each able to hold one or more packets. In this way the two signal inputs and the two signal outputs of a binary switching element part of an intermediate stage are each associated with such a buffer. Nevertheless, blocking can still occur for such a switching element when the buffer at one of its output terminals is full.

In the article "THE KNOCKOUT SWITCH: A SIMPLE, MODULAR ARCHITECTURE FOR HIGH-PERFORMANCE PACKET SWITCHING" by Y. S. Yeh et al published in the proceedings of ISS '87 pages 0801 to 0808 as well as in the European patent application by the same inventors published under No. 0256702, a so-called N-input, N-output "knockout" packet switch uses N output interface units, each with N packet filters associated with the N signal inputs, a concentrator which achieves an N to L concentration, with $L << N$, and an output buffer in order to have a lost packet rate as small as desired. However, if more than L packets or cells for the same signal output arrive simultaneously on the signal inputs, the extra packets are lost, even at a low transmission rate. Moreover, the modularity advantage of this known system increasing with the size thereof, it will preferably be used in large switching systems.

The present invention more particularly relates to a communication switching element for transferring digital signals, grouped in cells, from a plurality of signal inputs to a plurality of signal outputs, said switching element including a plurality of buffer means each associated and permanently dedicated to a distinct connection between any predetermined pair of signal input and signal output, and including a plurality of priority circuits each interconnecting the buffer means of a respective associated set and each allowing said transfers one at a time from the buffer means of said associated set.

Such a switching element is already known in the art, e.g. from the International Patent Application WO86/02510 published on Apr. 24, 1986. Therein, all the signal inputs are simultaneously able to transfer their input signals to the dedicated buffer means used. Hence, the speed of transmission of the signals between an input and an output never needs to exceed the speed of the input signals and thus no additional speed reduction circuit is required. Moreover, because each signal output uses a plurality of buffer means which are each dedicated to a distinct signal input and only receive signals therefrom, the size of these buffer means may be relatively small. Furthermore, the priority circuits thereof allow the cells or packets to exit from the buffer means either in the order of their arrival therein or according to a priority scheme by which the cell having the highest priority exits first.

This means that in the known switching element the buffer means are emptied either in sequence when all the cells have a same priority or in an order dependent on the degree of priority of each particular cell.

A problem with the known switching element is that, when for instance there is a high cell traffic between a particular signal input and a particular signal output, the corresponding buffer means could be filled faster than they are emptied. Indeed, in case all the cells have a same priority and the buffer means of a same set are thus emptied in sequence, the above fastly filled buffer means could rapidly overflow whereby some cells may be lost. Moreover, when the cells have different degrees of priority and when for instance most of the cells having a low priority degree are loaded in the above high traffic buffer means, the risk of cell loss is even greater.

DISCLOSURE OF INVENTION

An object of the present invention is to provide a switching element of the last mentioned known type but offering advantages over the known solutions including versatility in the ways it can be used. More particularly an object is to provide a switching element wherein the order in which the buffer means are emptied can be adapted to some particular circumstances, i.e. that the order will no more only depend on a possible degree of priority associated with each cell.

According to the invention, this object is achieved due to the fact that each of said priority circuits is constituted by a token ring wherein a priority indicating token signal is successively passed to the buffer means of the associated set to allow the one receiving said token signal to transfer at least one of said cells to a signal output associated in common with the buffer means of said set prior to passing said token signal to another buffer means of said set.

In this way, the order in which the buffers means are emptied is no more only defined by a possible degree of priority associated with each cell but can be adapted to particular circumstances. For instance, when there is a risk of overflow of some buffer means the token signal may be given in priority to the latter.

It is to be noted that the case of cells having different degrees of priority will not be considered in more detail hereafter.

Another characteristic feature of the present invention is that each of said sets of buffer means is coupled to a distinct signal output.

Then, the traffic of cells to a particular signal output does not affect the traffic of cells to other signal outputs.

In a preferred embodiment, each of said token rings includes means to detect the degree of filling of the buffer means of the associated set in order to pass said token signal in priority to the buffer means of said set having the highest degree of filling.

This reduces even more the risk of overflow of the buffer means, i.e. to lose cells. Such a particular circumstance may occur when there is a temporary high cell traffic between one signal input and one signal output as mentioned above.

Another general problem with switching elements such as the known ones mentioned above is that it is not easy to distribute an input cell to more than one signal output, i.e. to perform point-to-multipoint transmission (multicast or broadcast connections). Indeed, the input cell has then to be copied several times or to several buffer means in order to transmit each cell—or a copy thereof—to the corresponding destination signal output, this requiring additional complex circuits.

Still another object of the present invention is to provide a switching element of the above known type but wherein point-to-multipoint transmission is facilitated.

According to the invention this other object is achieved due to the fact that each signal input is coupled to an associated second set of buffer means via a common input data bus and via a selection bus to select the buffer means of said associated second set into which a cell supplied to said common input data bus has to be loaded.

In this way, an input cell is automatically copied and loaded into all the buffer means selected by the selection bus and associated to the respective signal outputs participating in the point-to-multipoint transmission. Moreover, identical cells, i.e. with a same header, are transmitted to the different signal outputs.

Also in a preferred embodiment, each cell has a header indicative of its destination and the buffer means are constituted by first-in-first-out (FIFO) memories able to store a plurality of cells.

It is to be noted that in the present switching element, each buffer means of the second set also forms part of a distinct one of the first mentioned sets and that these first and second sets of buffer means are arranged in a matrix comprising a number of buffer means equal to the product of the number of signal inputs and the number of signal outputs, with at least one of said numbers being larger than 2.

The new switching element further includes a plurality of receiver means, each interconnecting a respective signal input to its associated common input data bus and selection bus, said receiver means being able to transfer said cells received at said signal input to said common input data bus and to supply to said selection bus a signal to select at least one of said buffer means of said associated second set. These receiver means include conversion means to convert cells received in a serial way at the serial inputs into parallel signals prior to transmit them to the corresponding input data bus.

Furthermore, each of said receiver means includes cell buffer means to receive a cell with its header from said signal input and coupled to a routing table able to provide as a function of said received header a new header for which said received header will be substituted, said cell with said new header being then transmitted by said cell buffer means to said input data bus.

The routing tables of the receiver means may be coupled to a common processor means able to update the operation of said routing tables.

On the one hand, this common processor means is coupled to the cell buffer means of said receiver means in order to transmit therethrough cells from said common processor means and intended for the corresponding input data busses.

On the other hand, the cell buffer means of said receiver means is coupled to said common processor means to transmit thereto cells received from the corresponding signal input.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
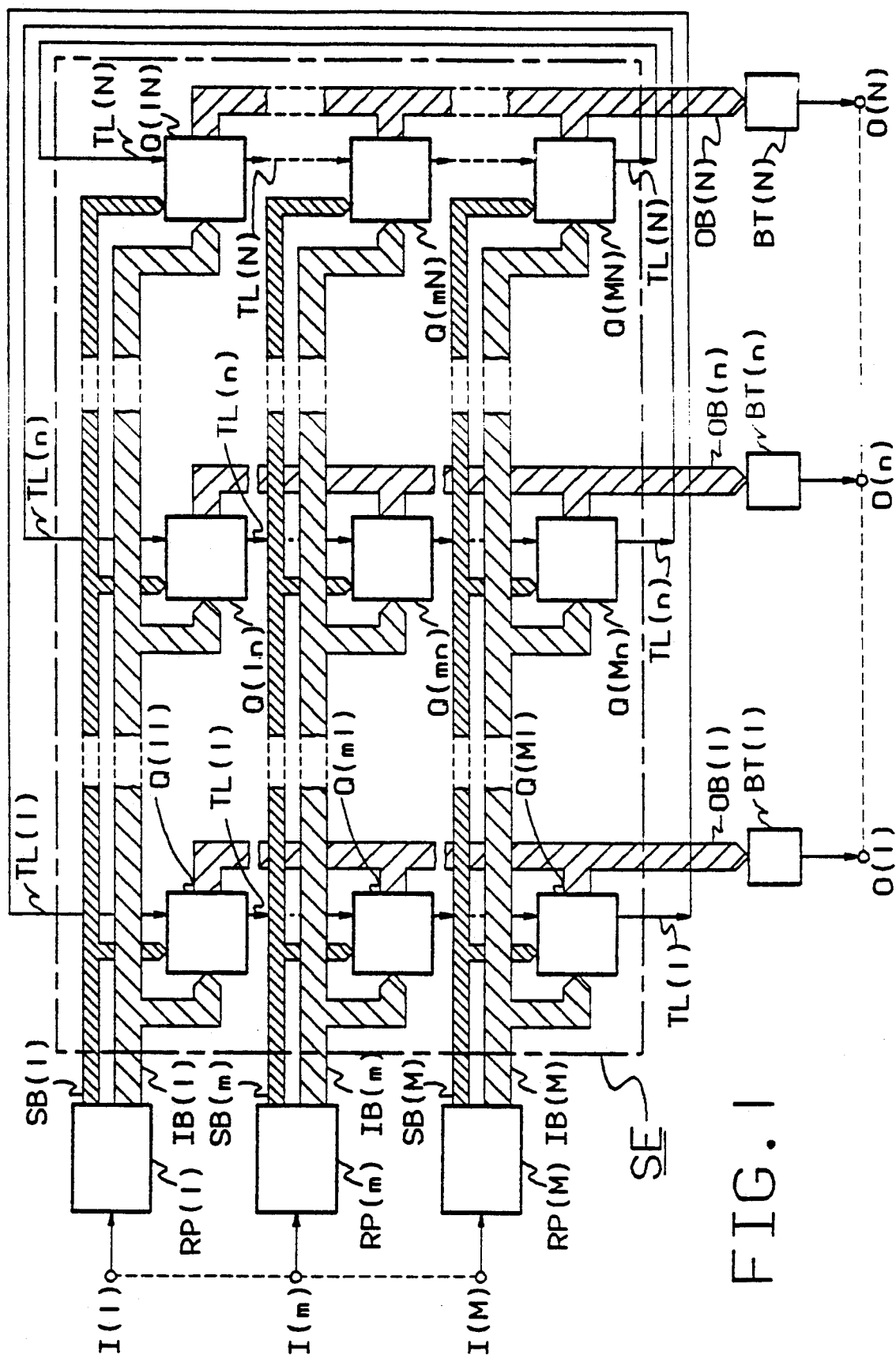
FIG. 1 is a schematic representation of a communication switching element SE according to the invention.

The communication switching element SE shown in FIG. 1 forms part of a communication switching network wherein a plurality of such elements are interconnected in a modular way and of which an example will be given later. Each switching element SE is able to switch fixed length packets or cells of digital signals transmitted according to Asynchronous Transfer Mode (ATM), previously called Aynchronous Time Division (ATD), techniques from a plurality of M signal inputs I(1) to I(M), coupled thereto via respective like receiver ports RP(1) to RP(M), to a plurality of N signal outputs O(1) to O(N) to which the element is coupled via respective like bus termination circuits BT(1) to BT(N). A description of the structure and the operation of a receiver port, say RP(m) with m being an integer between 1 and M, will be given later by making reference to FIG. 3. Any bus termination circuit, say BT(n) with n being an integer between 1 and N, performs a buffering function and, if required, a parallel-to-series conversion of the cells supplied to it. Each cell comprises for instance 35 bytes of which 3 bytes are used as a header containing 2 bytes or 16 bits constituting a virtual circuit number, 5 bits for error checking and correction and 3 spare bits, and of which the 32 remaining bytes constitute an information field.

The switching element SE includes M×N buffer means or queues arranged in a matrix of M rows Q(11) to Q(1N); ...; Q(m1) to Q(mN); ...; Q(M1) to Q(MN) and N columns Q(11) to Q(M1); ... Q(1n) to Q(Mn); ...; Q(1N) to Q(MN). Each of these queues Q(11) to Q(MN) is for instance constituted by a first-in-first-out (FIFO) memory able to store, e.g., 10 cells of 35 bytes. Each of the M receiver ports RP(1)/(M), e.g. RP(m), is connected to a respective m-th row comprising a set of N queues Q(m1) to Q(mN) through an associated 8 lines common input data bus IB(m) and an associated N lines selection bus SB(m) with each of these N lines associated to a distinct one of the N columns of queues. Each of these N columns, say the n-th, comprises a set of M queues Q(1n) to Q(Mn) and is connected to a respective bus termination circuit BT(n) by an associated 8 lines common output data bus OB(n). The receiver port RP(m) associated to the sets of N queues of an m-th row is able to convert the cells received, e.g., in a serial way on its signal input I(m) into a succession of parallel bytes and apply them to anyone of the N queues of the set of this m-th row via the associated input data bus IB(m). One or more queues into which a cell has to be loaded are selected by means of the lines of the selection bus SB(m) respectively associated with to the sets of columns to which these queues belong. A point-to-point transmission is thus performed when only one column, i.e. one queue, is selected, whilst a point-to-multipoint transmission, also called multicast, takes place when more columns, i.e. more queues of a same row, are selected as will become clear later. On the other hand, multipoint-to-point transmission, also called concentration, may be performed when several queues of a same column are selected by different selection busses.

All the queues Q(1n) to Q(Mn) of a set of a same n-th column are further interconnected by a priority circuit constituted by a token line TL(n) which is connected in a ring and wherein a token signal is transmitted between the interconnected queues according to an algorithm described later and indicating the queue having transmission priority as well as the number of cells this queue is allowed to transmit to the corresponding bus termination circuit RT(n) via the output data bus OB(n).

Due to the modularity of the switching element SE, all the queues Q(m1) to Q(mN) of a same m-th row or all the queues Q(1n) to Q(Mn) of a same n-th column may be arranged for instance on a same chip of integrated circuits and these chips or modules may be easily interconnected. As a consequence, the number M of signal inputs of an existing M×N switching network may be increased just by adding rows of queues. Similarly, the number N of signal outputs of an existing M×N switching network may be increased by adding columns of queues. The only restriction in this last case is the number of selection lines constituting the selection bus SB. Indeed, as mentioned above, each queue of a row is associated to a distinct line of this selection bus SB.

Figure 2:
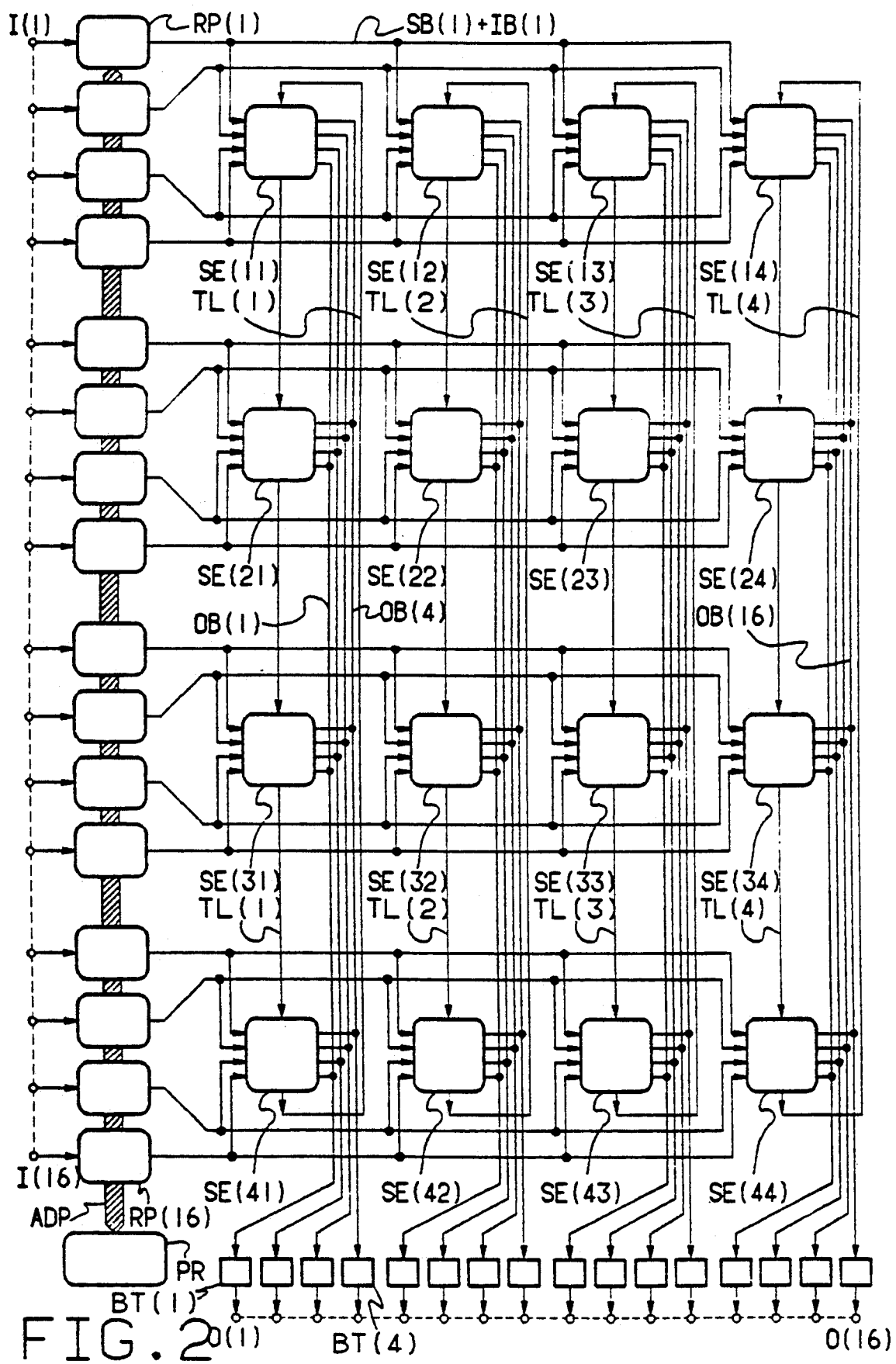
FIG. 2 shows an example of use of the switching element SE of FIG. 1 as a module of a 16×16 switching network.

An example of a 16×16 switching network wherein switching elements SE each comprising 4×4 queues grouped on a same chip are used is shown in FIG. 2. This switching network comprises 4 rows of 4 such switching elements SE(11) to SE(14); ...; SE(41) to SE(44). The left hand side of FIG. 2 shows 6 receiver ports RP(1) to RP(16) all connected to a processor PR via a bidirectional bus ADP and having respective signal inputs I(1) to I(16). For each receiver port the input data bus and the selection bus are represented together by a single line. For instance SB(1)+IB(1) is associated with the receiver port RP(1). The output data busses OB(1) to OB(16) connected to the respective bus termination circuits BT(1) to BT(16) are also each represented by a single line. The switching elements of each of the columns SE(11) to SE(41); ...; SE(14) to SE(44) are interconnected via a respective token line TL(1); ...; TL(4). Each of these token lines is connected in a ring, i.e. that the token line output of a bottom switching element, e.g. SE(41), is connected to the token line input of a top switching element, e.g. SE(11).

Depending on the application different algorithms may be used to control the token lines.

The most straightforward one consists in passing the token signal successively to all the queues of a same column:

if a queue is not empty when receiving the token signal it has priority to transmit one cell to the associated output data bus and holds the taken signal for the duration of the transmission of this cell;

if the queue is empty, the token signal is immediately passed to the next queue in the column so that no time is wasted.

A variant of the above is to make the number of cells which are allowed to be transmitted by the priority dependent on the degree of filling of this queue. This reduces the danger of cell loss by queue overflow.

In another solution the token ring is constituted by a ring of status lines (not shown) interconnecting all the queues of a same column and indicating the one having the highest degree of filling. In order to decrease the danger of cells loss the token signal is given in priority to this queue storing the highest number of cells.

Figure 3:
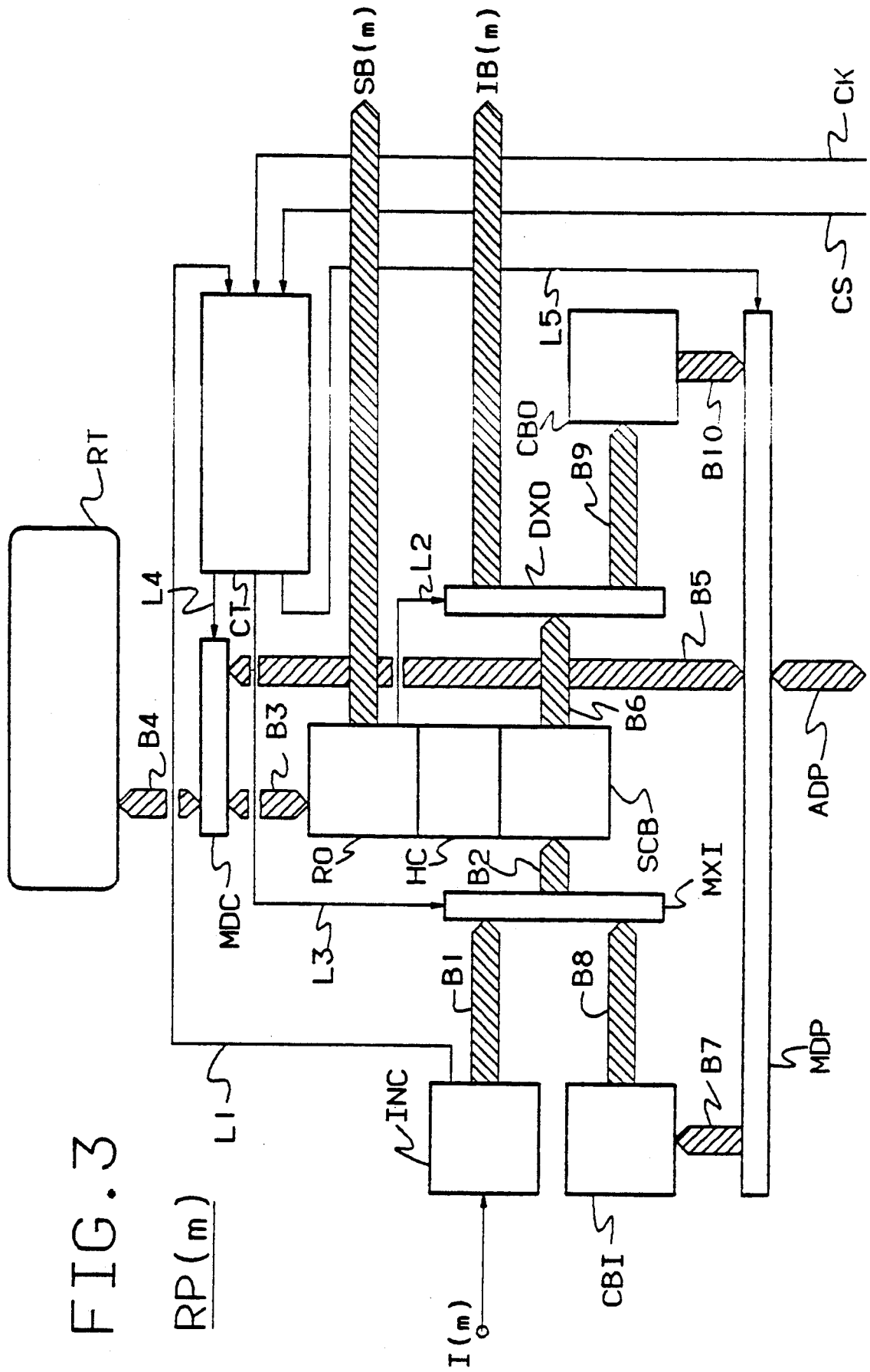
FIG. 3 shows a receiver port RP(m) of FIG. 1 in more detail.

The receiver port RP(m) with its signal input I(m), its input data bus IB(m) and its N-lines selection bus SB(m) is shown in more detail in FIG. 3. It includes a synchronisation circuit INC which has the signal input I(m) and is connected by a data bus B1 to a first input of a multiplexer MXI and by a control line L1 to a controller CT. INC is also able to perform series-to-parallel conversion if the internal width of the data busses, e.g. the bus B1, is wider than that of the input line, by which INC is connected to the signal input I(m), i.e. for instance when the cells are received in a serial way on this signal input I(m) as mentioned above. The output of the multiplexer MXI is connected by a data bus B2 to a single cell buffer SCB which is itself connected, in series with a header check and correction circuit HC, to a routing circuit RO. The routing circuit RO is connected to a first terminal of a multiplexer/demultiplexer MDC by a bidirectional bus B3. A second terminal of this multiplexer/demultiplexer MDC is connected to a routing table RT by a bidirectional bus B4 whilst a third terminal of MDC is connected to a first terminal of another multiplexer/demultiplexer MDP via a bidirectional bus B5. The multiplexing part of MDC has inputs constituted by the above first and third terminals and an output constituted by the above second terminal, whilst the demultiplexing part of MDC has an input constituted by the second terminal and outputs constituted by the first and third terminals. The single cell buffer SCB is also connected via a bus B6 to the input of a demultiplexer DXO which has a first output connected to the input data bus IB(m), whilst the routing circuit RO is directly connected to the selection bus SB(m) and controls the selection input of this demultiplexer DXO via a control line L2. The controller CT receives a clock signal via a line CK and control signals from the series-to-parallel converter and synchronization circuit INC via the line L1 and from a processor PR (shown in FIG. 2) via a selection line CS (Chip Select). This controller CT controls the operation of the above multiplexer MXI and the multiplexers/demultiplexers MDC and MDP via the respective selection lines L3, L4 and L5. As shown in FIG. 2, the processor PR is connected to all the receiver ports of a switching network by a bidirectional data and address bus ADP which is connected to a second terminal of the multiplexer/demultiplexer MDP. MDP has a third terminal connected via a bus B7 to an input cell buffer CBI which is itself connected to a second input of the multiplexer MXI via a bus B8. A second output of the demultiplexer DXO is connected to an output cell buffer CBO via a bus B9 and this output cell buffer CBO is connected to a fourth terminal of the multiplexer/demultiplexer MDP via a bus B10. The multiplexing part of MDP has inputs constituted by the above first and fourth terminals and an output constituted by the above second terminal, whilst the demultiplexing part of MDP has an input constituted by this second terminal and outputs constituted by the first and third terminals.

The cells supplied in a serial way to the series-to-parallel converter and synchronization circuit INC are converted therein into sets of e.g., 8 parallel bits which are then transmitted and latched into the single cell buffer SCB via the multiplexer MXI. When an error in the synchronization of an incoming cell is detected by the series-to-parallel converter and synchronization circuit INC, a signal is transmitted via the line L1 to the controller CT which is able to execute the appropriate action. When a cell is stored in SCB the header thereof is sent to the header check and correction circuit HC for testing its validity and for correcting some types of recoverable errors. This header is then transmitted via the multiplexer/demultiplexer MDC to the routing table RT which contains a table wherein headers of cells and associated routing information are stored. In the routing table RT the incoming header acts as a pointer for this table and is translated into an outgoing header which is returned, together with routing information, to the routing circuit RO. The outgoing header is directly transmitted to the single cell buffer SCB where it is substituted for the incoming header and the updated cell is then transmitted on the input data bus IB(m) via the demultiplexer DXO. Simultaneously, the routing information constituted, e.g., by an N-bits binary word is transmitted to the routing circuit RO which applies it, one bit per line, to the N-lines selection bus SB(m) and at the same time activates the selection line L2 of the demultiplexer DXO which accordingly selects its first output. Each line of the selection bus SB being connected to a distinct queue, the value of the bit transmitted on this line indicates whether the corresponding queue is selected (bit=1) or not (bit=0) for receiving the cell then transmitted on the input data bus IB(m).

The contents of the routing table may be updated by the processor PR which has a direct access to it via the busses ADP, B5 and B4 and the multiplexers/demultiplexers MDP and MDC. Furthermore, the processor PR may transmit a cell on the input data bus IB(m) or receive a cell via the signal input I(m) as will be described below. In case of a cell to be transmitted by the processor PR to the input data bus IB(m), this cell is loaded by PR in the input cell buffer CBI via the bus ADP, the multiplexer/demultiplexer MDP and the bus B7. As soon as no cell is transmitted by the parallel-to-series converter and synchronization circuit INC on the bus B1, the cell stored in the input cell buffer CBI is transmitted to the single cell buffer SCB via the busses B8 and B2 and the multiplexer MXI. From there this cell follows the same way as those coming from the input I(m). On the other hand, a cell destined to the processor PR follows the same way as a cell going to the input data bus IB(m) but in the demultiplexer DXO it is routed to the output cell buffer CBO via the bus B9. From the output cell buffer CBO this cell is transmitted to the processor PR via the multiplexer/demultiplexer MDP and the busses B10 and ADP.

A point-to-multipoint transmission of cells is largely facilitated by the structure of the switching element SE and its associated receiver ports RP(1) to RP(M). More particularly, contrary to a switching element wherein point-to-multipoint transmission is only possible by making copies of the cell to be transmitted and by changing the headers of these copies to address corresponding signal outputs, the present element SE operates in a different way. Indeed, the header of a cell is here not directly used to address a signal output so that this header needs not be changed for each signal output participating in the multipoint transmission. Instead, in this switching element SE the correct signal outputs O(1) to O(M) are solely selected by means of their respective associated lines of the selection bus SB. These lines are activated (bit=1) when the associated signal output is selected, and de-activated (bit=0) otherwise. As a consequence, each cell transmitted by a receiver port RP(m) on the input data bus IB(m) is copied into all the selected queues Q(m1)/(mN) and from there to all the selected signal outputs O(1)/(N).

While the principles of the invention have been described above in connection with specific apparatus, it is to be clearly understood that this description is made only by way of example and not as a limitation on the scope of the invention.

I claim:

1. Communication switching element for transferring digital signals, grouped in cells, from a plurality of signal inputs to a plurality of signal outputs, said switching element comprising:

a plurality of buffer means each associated with and permanently connected between a different pair of one of said signal inputs and one of said signal outputs to thereby provide a corresponding plurality of transfer paths from each signal input to each signal output, said plurality of buffer means being organized into a plurality of distinct first sets of buffer means with each of said first sets being associated with a different one of said signal outputs and with each of said signal outputs being connected in common with all of its thus-associated buffer means, and a plurality of token ring priority circuits each interconnecting a different respective first set of said buffer means, wherein each of said priority circuits passes a respective priority indicating token signal in a predetermined priority sequence to all the buffer means in its respective first set of buffer means, to thereby allow at least one said cell to be transferred to the respective signal output from a higher-priority buffer means receiving said respective priority indicating token signal prior to said token signal being passed to a lower-priority said buffer means of said respective first set, wherein each of said token ring priority circuits further comprises means to detect the degree of filling of each of the buffer means of the associated first set in order to pass said token signal in priority to the buffer means of said first set having the highest degree of filling.

2. Communication switching element according to claim 1, wherein said buffer means is organized into a plurality of distinct second sets each coupled to a different one of said signal inputs, and said switching element further comprises a plurality of input data buses each coupled to a respective second set of said buffer means and its respective signal input and a plurality of selection buses each associated with a respective said input data bus and coupled to its respective second set of said buffer means for selecting a buffer means of said respective second set into which a cell supplied to its respective signal input will be loaded.

3. Communication switching element according to claim 2, wherein each buffer means of said respective second set also forms part of a different one of said first sets.

4. Communication switching element according to claim 2, wherein said first and second sets of buffer means are arranged in a matrix comprising a number of buffer means equal to the product of a first number of signal inputs and a second number of signal outputs, with at least one of said first and second numbers being larger than 2.

5. Communication switching element according to claim 2, further comprising a plurality of receiver means, each interconnecting a respective signal input to its respective input data bus and to its respective selection bus, for transferring said cells received at said respective signal input to said respective input data bus and for supplying to said respective selection bus a respective selection signal to select at least one of said buffer means of the respective second set.

6. Communication switching element according to claim 5, wherein each said receiver means further comprises conversion means to convert cells received in a serial way at the serial inputs into parallel signals prior to transmitting them to the corresponding input data bus.

7. Communication switching element for transferring digital signals, grouped in cells, from a plurality of signal inputs to a plurality of signal outputs, wherein each of said cells has a header indicative of its destination, said switching element comprising:

a plurality of buffer means each associated with and permanently connected between a different pair of one of said signal inputs and one of said signal outputs to thereby provide a corresponding plurality of transfer paths from each signal input to each signal output, said plurality of buffer means being organized into a plurality of distinct first sets of buffer means with each of said first sets being associated with a different one of said signal outputs and with each of said signal outputs being connected in common with all of its thus-associated buffer means, said buffer means also being organized into a plurality of distinct second sets each coupled to a different one of said signal inputs, a plurality of token ring priority circuits each interconnecting a different respective first set of said buffer means, wherein each of said priority circuits passes a respective priority indicating token signal in a predetermined priority sequence to all the buffer means in its respective first set of buffer means, to thereby allow at least one said cell to be transferred to the respective signal output from a buffer means receiving said respective priority indicating token signal prior to said token signal being passed to another said buffer means of said respective first set, a plurality of input data buses each coupled to a respective second set of said buffer means and its respective signal input and a plurality of selection buses each associated with a respective said input data bus and coupled to its respective second set of said buffer means for selecting a buffer means of said respective second set into which a cell supplied to its respective signal input will be loaded, and a plurality of receiver means, each interconnecting a respective signal input to its respective input data bus and to its respective selection bus, for transferring said cells received at said respective signal input to said respective input data bus and for supplying to said respective selection bus a respective selection signal to select at least one of said buffer means of the respective second set, wherein each of said receiver means includes conversion means to convert cells received in a serial way at the serial inputs into parallel signals prior to transmitting them to the corresponding input data bus, and a respective cell buffer means to receive a cell with its header from said signal input and coupled to a respective routing table for substituting a new header as a function of said received header, said cell with said new header being then transmitted by said cell buffer means to said input data bus.

8. Communication switching element according to claim 7, wherein the respective routing table of each of said receiver means is coupled to common processor means for updating the operation of each said routing table.

9. Communication switching element according to claim 8, wherein said common processor means is coupled to the cell buffer means of said receiver means in order to transmit therethrough cells from said common processor means and intended for the corresponding input data busses.

10. Communication switching element according to claim 8, wherein the cell buffer means of said receiver means is coupled to said common processor means to transmit thereto cells received from the corresponding signal input.

11. Communication switching element according to claim 1, wherein each said buffer means further comprises a first-in-first-out memory for storing a plurality of said cells.

* * * * *